United States Patent
McDaniel et al.

(10) Patent No.: US 9,376,511 B2
(45) Date of Patent: Jun. 28, 2016

(54) POLYMERIZATION CATALYSTS AND POLYMERS

(71) Applicant: Chevron Phillips Chemical Company LP, The Woodlands, TX (US)

(72) Inventors: Max P. McDaniel, Bartlesville, OK (US); Kathy S. Collins, Bartlesville, OK (US); Eric D. Schwerdtfeger, Bartlesville, OK (US); Alan L. Solenberger, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/799,516

(22) Filed: Mar. 13, 2013

(65) Prior Publication Data

US 2014/0275457 A1    Sep. 18, 2014

(51) Int. Cl.
| | | |
|---|---|---|
| *C08F 4/24* | (2006.01) | |
| *B01J 21/00* | (2006.01) | |
| *B01J 31/00* | (2006.01) | |
| *C08F 4/22* | (2006.01) | |
| *C08F 10/00* | (2006.01) | |

(52) U.S. Cl.
CPC .. *C08F 4/22* (2013.01); *C08F 10/00* (2013.01)

(58) Field of Classification Search
CPC ........ B01J 23/26; B01J 37/12; B01J 2531/62; B01J 21/00; B01J 31/00; C08F 4/24
USPC ..................... 502/256; 526/90, 106
See application file for complete search history.

(56) References Cited

U.S. PATENT DOCUMENTS

| | | | |
|---|---|---|---|
| 2,951,816 A | 9/1960 | Hogan et al. | |
| 3,248,179 A | 4/1966 | Norwood | |
| 3,281,405 A | 10/1966 | Hogan | |
| 3,362,946 A | 1/1968 | Hogan | |
| 3,446,754 A | 5/1969 | Solvik et al. | |
| 3,624,063 A | 11/1971 | Witt | |

(Continued)

FOREIGN PATENT DOCUMENTS

| | | |
|---|---|---|
| EP | 0055864 A2 | 7/1982 |
| EP | 0640625 | 3/1995 |

(Continued)

OTHER PUBLICATIONS

English translation of Morikawa et al.*

(Continued)

*Primary Examiner* — Alexa Neckel
*Assistant Examiner* — Elizabeth Eng
(74) *Attorney, Agent, or Firm* — Conley Rose, P.C.; Rodney B. Carroll; Cheryl L. Huseman (57) ABSTRACT

A method comprising contacting a support material with a transition metal compound to produce a mixture; thermally treating the mixture in the presence of oxygen at a temperature in a range of from about 100° C. to about 500° C. for a period of from about 1 hour to about 10 hours, wherein at least a portion of the transition metal sublimes onto the support material to produce a support material comprising a dispersed transition metal; and thermally treating the support material comprising the dispersed transition metal in an oxidizing atmosphere at a temperature in a range of from about 550° C. to about 900° C. for a period of from about 1 hour to about 10 hours to produce a polymerization catalyst.

10 Claims, 2 Drawing Sheets

(56) References Cited

U.S. PATENT DOCUMENTS

| | | | |
|---|---|---|---|
| 3,629,216 A | | 12/1971 | Iwasaki et al. |
| 3,806,500 A | | 4/1974 | Karol |
| 3,887,494 A | * | 6/1975 | Dietz .................... 502/236 |
| 3,976,632 A | | 8/1976 | Delap |
| 4,022,580 A | | 5/1977 | Rush |
| 4,041,224 A | | 8/1977 | Hoff et al. |
| 4,136,061 A | | 1/1979 | Hogan et al. |
| 4,151,122 A | | 4/1979 | McDaniel et al. |
| 4,247,421 A | | 1/1981 | McDaniel et al. |
| 4,296,001 A | | 10/1981 | Hawley |
| 4,310,440 A | | 1/1982 | Wilson et al. |
| 4,397,769 A | | 8/1983 | McDaniel et al. |
| 4,405,501 A | | 9/1983 | Witt |
| 4,424,341 A | | 1/1984 | Hanson et al. |
| 4,436,882 A | | 3/1984 | Witt |
| 4,501,885 A | | 2/1985 | Sherk et al. |
| 4,547,557 A | | 10/1985 | McDaniel |
| 4,588,790 A | | 5/1986 | Jenkins, III et al. |
| 4,613,484 A | | 9/1986 | Ayres et al. |
| 4,737,280 A | | 4/1988 | Hanson |
| 5,006,506 A | | 4/1991 | Hsieh et al. |
| 5,200,478 A | | 4/1993 | Vogels et al. |
| 5,290,748 A | | 3/1994 | Knuuttila et al. |
| 5,352,749 A | | 10/1994 | DeChellis et al. |
| 5,436,304 A | | 7/1995 | Griffin et al. |
| 5,455,314 A | | 10/1995 | Burns et al. |
| 5,565,175 A | | 10/1996 | Hottovy et al. |
| 5,575,979 A | | 11/1996 | Hanson |
| 5,597,892 A | | 1/1997 | Hanson |
| 5,599,887 A | | 2/1997 | Badley et al. |
| 6,187,866 B1 | * | 2/2001 | Jorgensen et al. ............ 525/197 |
| 6,200,920 B1 | | 3/2001 | Debras et al. |
| 6,239,235 B1 | | 5/2001 | Hottovy et al. |
| 6,262,191 B1 | | 7/2001 | Hottovy et al. |
| 6,359,085 B1 | | 3/2002 | Lhost et al. |
| 6,489,428 B1 | | 12/2002 | Debras et al. |
| 6,500,780 B1 | | 12/2002 | Suntola et al. |
| 6,518,375 B1 | | 2/2003 | Monoi et al. |
| 6,559,087 B1 | | 5/2003 | De Lange et al. |
| 6,617,404 B2 | | 9/2003 | Shveima |
| 6,683,022 B1 | | 1/2004 | De Lange et al. |
| 6,833,415 B2 | | 12/2004 | Kendrick et al. |
| 7,223,823 B2 | | 5/2007 | Lin |
| 7,271,122 B2 | | 9/2007 | Bodart et al. |
| 7,348,384 B2 | | 3/2008 | Schneider et al. |
| 7,381,778 B2 | | 6/2008 | Katzen et al. |
| 7,384,885 B2 | | 6/2008 | Roger et al. |
| 7,589,044 B2 | | 9/2009 | McDaniel et al. |
| 7,615,510 B2 | | 11/2009 | McDaniel et al. |
| 7,981,832 B2 | | 7/2011 | McDaniel et al. |
| 8,183,173 B2 | | 5/2012 | McDaniel et al. |
| 2005/0255987 A1 | * | 11/2005 | McDaniel et al. ............ 502/38 |
| 2009/0082197 A1 | * | 3/2009 | McDaniel et al. ............ 502/242 |
| 2013/0310526 A1 | * | 11/2013 | Jorgensen ................ B01J 37/04 526/106 |

FOREIGN PATENT DOCUMENTS

| | | | |
|---|---|---|---|
| EP | 0857737 A1 | | 8/1998 |
| EP | 0882740 A1 | | 12/1998 |
| JP | 2000281604 A | * | 10/2000 ............ C07C 29/04 |
| WO | 9302111 A1 | | 2/1993 |
| WO | 9311173 A1 | | 6/1993 |
| WO | 98/18834 | | 5/1998 |
| WO | 0035964 A1 | | 6/2000 |
| WO | 0068279 A1 | | 11/2000 |
| WO | 2005113146 A1 | | 12/2005 |
| WO | 2009045215 A1 | | 4/2009 |
| WO | 2009085100 A2 | | 7/2009 |
| WO | 2009085100 A3 | | 7/2009 |

OTHER PUBLICATIONS

Bird, R. Byron, et al., "Dynamics of polymeric liquids," vol. 1, Fluid Mechanics, Second Edition, 1987, pp. xiii to xviii, 171-172, plus cover and publication pages, John Wiley & Sons, Inc.

Foreign communication from a related counterpart application—International Search Report and Written Opinion, PCT/US2008/013497, Sep. 2, 2009, 13 pages.

Foreign communication from a related counterpart application—International Preliminary Report on Patentability, PCT/US2008/013497, Jun. 22, 2010, 10 pages.

Foreign communication from a related counterpart application—International Search Report and Written Opinion, PCT/US2005/016108, Sep. 27, 2005, 12 pages.

Foreign communication from a related counterpart application—International Preliminary Report on Patentability, PCT/US2005/016108, Nov. 14, 2006, 9 pages.

Foreign communication from a related counterpart application—Invitation to Pay Additional Fees, PCT/US2007/080329, Jun. 16, 2008, 6 pages.

Foreign communication from a related counterpart application—International Search Report and Written Opinion, PCT/US2007/080329, Oct. 21, 2008, 14 pages.

Foreign communication from a related counterpart application—International Preliminary Report on Patentability, PCT/US2007/080329, Apr. 7, 2010, 10 pages.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheologica Acta, 1989, pp. 321-332, vol. 28.

Jóźwiak, Wojciech K., et al., "Interactions between the chromium oxide phase and support surface; redispersion of α-chromia on silica, alumina and magnesia," XP-000659935, J. Chem. Soc., Faraday Trans., 1997, pp. 2583-2589, vol. 93, No. 15.

McDaniel, Max P., et al., "Excess oxygen of chromia, I," Journal of Catalysis, 1975, pp. 394-403, vol. 36, Academic Press, Inc.

McDaniel, Max P., et al., "Excess oxygen of chromia, II. Reaction with diphenylpicrylhydrazine," Journal of Catalysis, 1975, pp. 404-412, vol. 36, Academic Press, Inc.

McDaniel, Max, et al., "New developments in chrome catalyst technology for the loop slurry process," Oct. 2006, 5 pages, Chevron Phillips Chemical Company, LP.

McDaniel, M. P., et al., "The activation of Phillips Cr/silica catalysts v. stability of Cr(VI)," Applied Catalysis A: General, 2008, pp. 252-261, vol. 335, Elsevier B.V.

McDaniel, M. P., et al., "The activation of the Phillips polymerization catalyst, III. Promotion by titania," Journal of Catalysis, 1983, pp. 118-126, vol. 82, Academic Press, Inc.

McDaniel, M. P., "The state of Cr(VI) on the Phillips polymerization catalyst, IV. Staturation coverage," Journal of Catalysis, 1982, pp. 37-47, vol. 76, Academic Press, Inc.

Welch, M. B., et al., "The activation of the Phillips polymerization catalyst, II. Activation by reduction/reoxidation," Jounal of Catalysis, 1983, pp. 110-117, vol. 82, Academic Press, Inc.

International Search Report for PCT/US2014/023009 dated Sep. 1, 2014.

Invitation to Pay Additional Fees for PCT/US2014/023009 dated Jun. 27, 2014.

* cited by examiner

POLYMERIZATION CATALYSTS AND POLYMERS

FIELD

The present disclosure relates to catalyst compositions. More specifically, the present disclosure relates to methods of preparing polymerization catalysts.

BACKGROUND

Chromium-supported catalysts are used for the polymerization of olefin polymers. Enhancements in preparation methods for polymerization catalysts such as the chromium-supported catalysts can reduce the costs associated with catalyst production and improve process economics. In addition, changes in preparation methods of the catalysts may alter/modify the resultant catalyst such that the polymer produced displays one or more desirable properties such as improved processing characteristics. Thus, there is an ongoing need to develop new methods of preparing polymerization catalysts.

SUMMARY

Disclosed herein is a method comprising contacting a support material with a transition metal compound to produce a mixture; thermally treating the mixture in the presence of oxygen at a temperature in a range of from about 100° C. to about 500° C. for a period of from about 1 hour to about 10 hours, wherein at least a portion of the transition metal sublimes onto the support material to produce a support material comprising a dispersed transition metal; and thermally treating the support material comprising the dispersed transition metal in an oxidizing atmosphere at a temperature in a range of from about 550° C. to about 900° C. for a period of from about 1 hour to about 10 hours to produce a polymerization catalyst.

Also disclosed herein is a method comprising thermally treating a support material at a temperature in a range of from about 550° C. to about 900° C. for a period of from about 1 hour about 10 hours to produce a thermally-treated support; contacting the thermally-treated support material with a transition metal compound to produce a mixture; and thermally treating the mixture in the presence of oxygen at a temperature in a range of from about 200° C. to about 600° C. for a period of from about 1 hour to about 10 hours, wherein at least a portion of the transition metal sublimes onto the support to produce a polymerization catalyst.

DETAILED DESCRIPTION

Disclosed herein are methods of preparing a catalyst comprising contacting a support material with a transition metal compound to form a mixture and thermally treating the mixture to form a supported transition metal catalyst. In an embodiment, the transition metal compound sublimes during thermal treatment resulting in the about uniform dispersion of the transition metal onto the support material. Such catalysts are referred to herein as uniform dispersion via sublimation catalysts and designated CAT-A.

In another embodiment, a support material is thermally treated by heating the material to form a thermally-treated support material. The thermally-treated support material may be cooled to a predetermined temperature range and contacted with a transition metal compound to form a mixture. The mixture may then be subjected to a second thermal treatment to form a thermally-treated supported transition metal compound (e.g., catalyst). The thermally-treated supported transition metal may be contacted with an olefin monomer under conditions suitable for formation of a polymer. In such an embodiment, the polymer displays improved processing characteristics such as an increased melt index when compared to polymers prepared in the absence of a thermally-treated transition metal compound. Polymers displaying these improved processing characteristics are designated as PIPs and the catalysts used to form the PIPs are designated as CAT-B. These and other aspects are described in more detail herein.

In an embodiment, the catalyst (CAT-A and/or CAT-B) comprises a transition metal supported compound comprising a support material and a transition metal.

In various embodiments, the support material for CAT-A and/or CAT-B comprises an inorganic oxide such as silica, alumina, silica-alumina, titania, silica-titania, alumina-titania, aluminophosphates, magnesia, zirconia, silica-zirconia, alumina-zirconia, ceria, ceria-zirconia, clay, zeolites, or combinations thereof. The support material may have a surface area and pore volume effective to provide for the production of an active donor support (e.g., polymerization catalyst). In an embodiment, the support material possesses a surface area in the range of from about 10 $m^2$/gram to about 1000 $m^2$/gram, a pore volume in the range of from about 0.1 $cm^3$/gram to about 4.0 $cm^3$/gram and an average particle size in the range of from about 5 μm to about 500 μm. In another embodiment, the support material has a surface area in the range of from about 50 $m^2$/gram to about 500 $m^2$/gram, a pore volume of from about 0.5 $cm^3$/gram $cm^3$/gram to about 3.5 $cm^3$/gram, and an average particle size of from about 10 μm to about 200 μm. In yet another embodiment, the support material has a surface area in the range of from about 200 $m^2$/gram to about 400 $m^2$/gram, a pore volume from about 0.8 $cm^3$/gram to about 3.0 $cm^3$/gram, and an average particle size of from about 25 μm to about 150 μm. In still another embodiment, the support material has a surface area in the range of from about 200 $m^2$/gram to about 450 $m^2$/gram, a pore volume in the range of from about 1 $cm^3$/gram to about 2.5 $cm^3$/gram and an average particle size in the range of from about 40 μm to about 120 μm. In another embodiment, the support material has a surface area in the range of from about 250 $m^2$/gram to about 400 $m^2$/gram, a pore volume of from about 1.0 $cm^3$/gram to about 3.0 $cm^3$/gram, and an average particle size of from about 40 μm to about 120 μm. In yet another embodiment, the support material has a surface area in the range of from about 250 $m^2$/gram to about 600 $m^2$/gram, a pore volume in the range of from about 1.5 $cm^3$/gram to about 1.75 $cm^3$/gram, and an average particle size of from about 40 μm to about 120 μm. Generally, the average pore size of the support material ranges from about 10 Angstroms to about 1000 Angstroms. In one embodiment, the average pore size of the support material is in the range of from about 50 Angstroms to about 500

Angstroms, while in yet another embodiment the average pore diameter ranges from about 75 Angstroms to about 350 Angstroms. The support material may be prepared using any suitable methodology.

In an embodiment, the support material comprises any of the oxides described herein. For example, the support material may comprise silica and the silica support material may be made synthetically from sodium silicate. In an embodiment, the silica support material may have a surface area ranging from about 100 m$^2$/g to about 1000 m$^2$/g and a pore volume ranging from about 0.5 cc/g to about 2.8 cc/g.

Alternatively, the support material comprises alumina. The alumina support may be made using methodologies such as for example: reacting sodium aluminate, which is basic, with aluminum sulfate, which is acidic; neutralizing an aluminum salt with a base such as ammonia or ammonia hydroxide or sodium aluminate; performing flame hydrolysis of an aluminum compound; or performing hydrolysis of an organic solution of an aluminum compound by, e.g., adding water to an alcohol solution of aluminum isopropoxide (Al(OC$_3$H$_7$)$_3$). In an embodiment, the alumina support may have a surface area ranging from about 10 m$^2$/g to about 400 m$^2$/g and a pore volume ranging from about 0.1 cc/g to about 1.8 cc/g.

Alternatively, the support material comprises aluminophosphate. The aluminophosphate may be prepared by hydrothermal crystallization at elevated temperatures of aluminophosphate gels containing a molecular structure-forming template as described in U.S. Pat. No. 4,310,440 which is incorporated by reference herein in its entirety. Alternatively, aluminophosphate may be made by adding base to an acidic solution containing Al$^{+3}$ and PO$_4^{-3}$ ions, or alternatively it may be made by treating an alumina or aluminate support with a phosphate source such as phosphoric acid. In an embodiment, the aluminophosphate support material may have a surface area ranging from about 100 m$^2$/g to about 500 m$^2$/g and a pore volume ranging from about 1.0 cc/g to about 2.5 cc/g.

Alternatively, the support material comprises silica-titania. The silica-titania support may be made by co-gelation, heterogeneous co-precipitation, or surface impregnation. In an embodiment, the silica-titania support may have a surface area ranging from about 250 m$^2$/g to about 600 m$^2$/g and a pore volume ranging from about 1.0 cc/g to about 3.0 cc/g.

In an embodiment the support material comprises a mixed oxide in which the oxide components are silica, alumina, aluminophosphate titania, zirconia, etc., or combinations thereof, with unique microstructures, varied physical properties, and various methods of making such materials. Such mixed oxides also have continuous, tightly packed, gel network which routinely contain unique sheet structures. Furthermore, the mixed oxides are homogeneous (i.e., no individual separate oxide phases are observed), and the pore size, pore size distribution, and volume (meso) of these materials can be tailored.

In embodiments, the support material comprises a virgin support. Herein a virgin support refers to a support material that has not been contacted with and/or does not comprise a polymerization active compound. Such virgin support materials may be commercially available compounds that are used "as is" having not undergone any additional treatment following manufacture by a supplier, and thus are in an unadulterated state. Herein a polymerization active compound refers to a compound or species which may catalyze a polymerization reaction (e.g., polymerization of alpha olefins) or a precursor of such compounds or species. In embodiments, the virgin support material does not comprise an amount of one or more metals effective to catalyze a polymerization reaction such as olefin polymerization. For example, the virgin support does not include Group VI metals such as Cr, Mo, and/or W in amounts effective to catalyze polymerization reactions. In an embodiment, the virgin support does not comprise chromium or a chromium-containing compound in an amount effective to catalyze a polymerization reaction. In an embodiment, the support material is a virgin support that has not undergone any additional heat treatment since being manufactured, or alternatively has not been previously heated to a temperature of equal to or greater than about 200° C.

In an embodiment, CAT-A comprises silica, for example virgin silica, as the support material. In an embodiment, CAT-B comprises silica, for example silica-titania, as the support material. The amount of support material present in the catalyst (i.e., CAT-A and/or CAT-B) may be from about 90 weight percent (wt. %) to about 99.9 wt. % based on the total weight of the catalyst, alternatively from about 95 wt. % to about 99.5 wt. %, or alternatively from about 98 wt. % to about 99.5 wt. %.

In an embodiment, the catalyst comprises a transition-metal compound. Transition metal compounds suitable for use in the formation of a catalyst of the type disclosed herein (i.e., CAT-A and/or CAT-B) comprises a material that sublimes in the temperature ranges disclosed herein. In an embodiment, the transition metal compound comprises a chromium compound, alternatively a trivalent chromium complex with 2,4-pentadionate or a chromium complex with a derivative of 2,4-pentadionate. In an embodiment the chromium compound comprises chromium (III) acetylacetonate, Cr(acac)$_3$.

The amount of chromium present in the catalyst (i.e., CAT-A and/or CAT-B) may range from about 0.1 wt. % to about 10 wt. % based on the weight of the support (e.g., silica), alternatively from about 0.1 wt. % to about 2 wt. %, alternatively from about 0.55 wt. % to about 5 wt. %, or alternatively from about 0.5 wt. % to about 2 wt. %.

In an embodiment a method of preparing CAT-A comprises contacting a support material of the type disclosed herein (e.g., virgin silica) with a chromium (Cr)-containing compound (e.g., Cr(acac)$_3$). In the various embodiments disclosed herein, contacting of the Cr-containing compound and support material may occur in one or more contact zones. A contact zone is a zone in which the components are commingled and/or combined, and thereby contacted. The contact zone may be disposed in a vessel, e.g. a storage tank, tote, container, mixing vessel, reactor, etc.; a length of pipe, e.g. a tee, inlet, injection port, or header for combining component feed lines into a common line; or any other suitable apparatus for bringing the components into contact. As used herein, the terms contacted and combined refer to any addition sequence, order, or concentration for contacting or combining two or more catalyst components. As a result of such contact or combination, the catalyst components (i.e., Cr-containing compound and support material) may remain discrete, unattached or unbonded particles or may otherwise physically not combine, attach, bond, co-support, agglomerate, etc., for example until such time as the components undergo further processing or treatment (e.g., a heat treatment to induce sublimation) as disclosed herein. In some embodiments, contacting of components may occur in one or more upstream contact zone(s) prior to further contacting with other catalyst component(s) in one or more downstream contact zone(s). Where a plurality of contact zones are employed, contacting may occur simultaneously across the contact zones, sequentially across the contact zones, or both, as is suitable for a given embodiment. Contacting may be carried out in a batch or continuous process, as is suitable for a given embodiment.

In an embodiment, the Cr-containing compound and support material are contacted in a commercial polymerization reactor and/or in a catalyst activator vessel upstream of a commercial polymerization reactor.

In embodiments utilizing a vessel for contacting the components, the components may be optionally mixed by a mixer disposed in the vessel and the formed mixture may then be further processed. In embodiments, utilizing a tee or other means for combining lines such as a header, an optional in-line mixer may be placed in the commingled catalyst feed line to ensure that adequate contacting of the combined components takes place, and the mixture is thus formed as it passes through the commingled feed line.

In an embodiment, the contacting may occur in a fixed bed reactor (e.g., the support material and Cr-containing compound may be combined and placed in a fixed catalyst bed). Alternatively, the contacting can occur in a fluidized bed reactor where the components are contacted in situ under conditions that allow for the intimate contacting of the Cr-containing compound and support material. For example, the Cr-containing compound and support material may be introduced to a fluidized bed and allowed to contact in the presence of oxygen or air at an airflow rate of from about 0.01 to about 1.0 ft/s.

In an embodiment, the Cr-containing compound and support material after contact are subjected to a first thermal treatment by heating the mixture (i.e., Cr-containing compound and support material) to a temperature range of from about 100° C. to about 500° C., alternatively from about 150° C. to about 450° C. or alternatively from about 200° C. to about 400° C. for a period of time ranging from about 10 minutes to about 10 hours, alternatively from about 30 minutes to about 8 hours or alternatively from about 1 hour to about 5 hours. In an embodiment, the mixture (i.e., Cr-containing compound such as $Cr(acac)_3$ and support material such as virgin silica) is thermally treated by contact with a gas comprising oxygen, for example a fluidizing gas comprising oxygen (e.g., dry air). In such embodiments, the Cr-containing compound sublimes and is uniformly dispersed onto the inorganic support to form a support material comprising dispersed chromium. Also, where the gas (e.g., fluidizing gas) contains oxygen, at least a portion of the Cr(III) is converted to Cr(VI).

In embodiments, the Cr-containing compound when contacted with the support material comprises chromium in an inactive state (e.g., Cr(III)) that is activated by thermal treatment in an oxidizing atmosphere to an active state (e.g., Cr(VI)). Herein the use of the terms "inactive" and "active" refer to the ability of the material to function as a polymerization catalyst and more specifically assigns as an active polymerization catalyst a material having a portion of the total amount of Cr in the +6 oxidation state while an inactive polymerization catalyst would not have Cr in the +6 oxidation state (e.g., Cr(III)).

In an embodiment, CAT-A contains at least a portion of the total chromium as Cr(VI). Without wishing to be limited by theory, CAT-A when functioning as a polymerization catalyst may have the active site metals (i.e. Cr(VI)) undergo reaction with ethylene to generate lower valent chromium ions which may serve as the active site for polymerization of an alpha olefin. In an embodiment Cr(VI) is reduced to Cr(II) during the polymerization of an alpha olefin.

In an embodiment, CAT-A contains at least a portion of the total chromium as Cr(VI). The chromium (III) present in the chromium-containing compound may be oxidized to chromium (VI) by the oxygen-containing gas. In such embodiments, the percentage conversion of Cr(III) to Cr(VI) may range from about 1% to about 100%, alternatively from about 10% to about 100%, alternatively from about 20% to about 100% or alternatively from about 30% to about 100% in the temperature ranges disclosed herein (e.g., from about 100° C. to about 500° C. or from about 200° C. to about 500° C.).

Following the first thermal treatment, the mixture may be subjected to a second thermal treatment, for example at a higher temperature (e.g., a calcination treatment). Optionally, the mixture may be allowed to cool between the first and second thermal treatments. In an embodiment, a method of preparing CAT-A further comprises subjecting the support material comprising dispersed chromium to a second thermal treatment via heating. The heating may be carried out in a temperature range from about 500° C. to about 900° C., alternatively from about 550° C. to about 870° C., or alternatively from about 600° C. to about 800° C. for a time period of from about 10 minutes to about 24 hours, alternatively from about 30 minutes to about 15 hours, or alternatively from about 1 hour to about 10 hours. Heating of the support material comprising dispersed chromium may be carried out in any suitable atmosphere (e.g., reducing, inert). In an embodiment, thermal treatment of the support material comprising dispersed chromium may result in an active polymerization catalyst (i.e., CAT-A).

In an embodiment, a method of preparing CAT-B comprises thermally treating (e.g., calcining) a support material of the type disclosed herein to form a thermally-treated (e.g., calcined) support material. Thermal treatment of such support materials may involve heating the support material (e.g., silca, silica-titania) at a temperature of from about 550° C. to about 900° C., alternatively from about 600° C. to about 900° C. or alternatively from about 700° C. to about 900° C. for a time period of from about 10 minutes to about 24 hours, alternatively from about 30 minutes to about 15 hours or alternatively from about 1 hour to about 10 hours to form a thermally-treated (e.g., calcined) support material. Thermal treatment of the support material may be carried out in any suitable environment (e.g., reducing, oxidizing, inert). In an embodiment the support material is thermally treated in the presence of carbon monoxide. In an embodiment the thermally-treated support material may then be cooled to a temperature range of from about 25° C. to about 150° C., alternatively from about 25° C. to about 100° C., or alternatively from about 25° C. to about 50° C. to form a cooled, thermally-treated support material.

The cooled, thermally-treated support material may then be contacted with a Cr-containing compound of the type disclosed herein (e.g., $Cr(acac)_3$) to form a mixture. Contacting of the Cr-containing compound with the cooled, thermally-treated support material may be carried out using any suitable contact zone and/or methodology such as those previously described herein, for example as described for CAT-A.

In an embodiment, the mixture comprising a Cr-containing compound and cooled, thermally-treated support material is subjected to a thermal treatment to form a thermally treated, supported transition metal compound. In an embodiment the thermal treatment comprises heating the mixture to a temperature range which is less than the temperature range used for thermal treatment (e.g., calcining) of the support material, alternatively at least 700, 600, 500, 300, 200, or 150 degrees less than the temperature used for thermal treatment (e.g., calcining) of the support material. For example the thermal treatment may comprise heating the mixture to a temperature range of from about 200° C. to about 700° C., alternatively from about 300° C. to about 600° C., or alternatively from about 350° C. to about 650° C. In such embodiments, thermal treatment may be carried out for a time period ranging from about 10 minutes to about 10 hours, alternatively from about 30 minutes to about 5 hours, or alternatively from about 1 hour to about 3 hours. In an embodiment, the mixture (i.e., Cr-containing compound and cooled, thermally-treated support material) is thermally treated by contact with a gas comprising oxygen, for example a fluidizing gas comprising oxygen (e.g., dry air). In such embodiments, the Cr-containing compound sublimes and is uniformly dispersed onto the inorganic support to form a support material comprising dispersed chromium. Also, where the gas (e.g., fluidizing gas) contains oxygen, at least a portion of the Cr(III) is converted to Cr(VI). In an embodiment, thermal treatment of the mixture may result in a thermally treated, supported transition metal compound (e.g., catalyst). In an embodiment, thermal treatment of the mixture may result in an active polymerization catalyst (i.e., CAT-B).

In an embodiment, CAT-B contains at least a portion of the total chromium as Cr(VI). The chromium (III) present in the chromium-containing compound may be oxidized to chromium (VI) by the oxygen-containing gas. In such embodiments, the percentage conversion of Cr(III) to Cr(VI) may range from about 1% to about 100%, alternatively from about 10% to about 100% or alternatively from about 20% to about 100% in the temperature ranges disclosed herein (e.g., from about 100° C. to about 400° C.).

The polymerization catalysts of the present disclosure (i.e., CAT-A and CAT-B) are intended for any alpha olefin polymerization method, using various types of polymerization reactors. As used herein, "polymerization reactor" includes any polymerization reactor capable of polymerizing alpha olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the disclosure, the polymerization reactor system may comprise at least one loop slurry reactor. Such reactors may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A slurry polymerization process (also known as the particle form process), is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems d may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to still another aspect of the disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

In an embodiment, a slurry polymerization process is employed in which the catalyst is suspended in an inert organic medium and agitated to maintain it in suspension throughout the polymerization process. The organic medium may, e.g., be a paraffin, a cycloparaffin, or an aromatic. For the production of ethylene polymers, the slurry polymerization process may be carried out in a reaction zone at a temperature of from about 50° C. to about 110° C. and at a pressure in the range of from about 100 psia to about 700 psia or higher. At least one monomer is placed in the liquid phase of the slurry in which the catalyst is suspended, thus providing for contact between the monomer and the catalyst. The activity and the productivity of the catalyst are relatively high. As used herein, the activity refers to the grams of polymer produced per gram of solid catalyst charged per hour, and the productivity refers to the grams of polymer produced per gram of solid catalyst charged.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, resistance to crack growth, long chain branching and rheological measurements.

The concentrations of monomer, co-monomer, hydrogen, co-catalyst, modifiers, and electron donors are important in producing these resin properties. Comonomer is used to control product density. Hydrogen is used to control product molecular weight. Co-catalysts can be used to alkylate, scavenge poisons and control molecular weight. Modifiers can be used to control product properties and electron donors affect stereoregularity. In addition, the concentration of poisons must be minimized since they impact the reactions and product properties.

After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Catalysts prepared in accordance with the present disclosure (i.e., CAT-A and/or CAT-B) may be used for the polymerization of olefins, for example, alpha-olefins. In an embodiment, a catalyst (i.e., CAT-A and/or CAT-B) is contacted with one or more olefins in a reaction zone under suitable reaction conditions (e.g., temperature, pressure, etc.) to polymerize the olefins. Linear or branched alpha-olefins having 2 to 30 carbon atoms can be used as the olefins raw material. Specific examples of the alpha-olefins may include ethylene, propylene, 1-butene, 1-hexene, 1-octene, 3-methyl-1-butene, 4-methyl-1-pentene or the like.

Polyethylene homopolymers and copolymers of ethylene with other mono-olefins may be produced in the manner described above using the catalyst prepared as described herein. In an embodiment, the catalyst (i.e., CAT-A and/or CAT-B) is used to produce a polyethylene. In an embodiment, the catalyst (i.e., CAT-A and/or CAT-B) is used to produce a polyethylene copolymer (e.g., a copolymer with 1-hexene). In an embodiment, the catalyst (i.e., CAT-A and/or CAT-B) is used to produce a polyethylene homopolymer, alternatively a high density polyethylene.

In an embodiment, a polymer produced using CAT-B has a melt index that is at least two times greater than a polymer produced using CAT-A or an otherwise conventional chromium supported polymerization catalyst. Such polymers, designated PIPs may have a melt index ranging from about 0.1 g/10 min. to about 30 g/10 min., alternatively from about 0.5 g/10 min. to about 20 g/10 min., or alternatively from about 1 g/10 min. to about 10 g/10 min. The melt index (MI) refers to the amount of a polymer which can be forced through an extrusion rheometer orifice of 0.0825 inch diameter when subjected to a force of 2160 grams in ten minutes at 190° C., as determined in accordance with ASTM D 1238.

Polymers prepared using CAT-B may also display an increased high load melt index. The high load melt index (HLMI) refers to the rate of flow of a molten polymer resin through an orifice of 0.0825 inches diameter when subjected to a force of 21,600 grams at 190° C., as determined in accordance with ASTM D 1238. In an embodiment, CAT-B produces polymers having a high load melt index from about 1 g/10 min. to about 1000 g/10 min., alternatively from about 10 g/10 min. to about 500 g/10 min. or alternatively from about 50 g/10 min. to about 200 g/10 min.

Polymer resins produced as disclosed herein may be formed into articles of manufacture or end use articles using techniques such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth. Additional end use articles would be apparent to those skilled in the art.

EXAMPLES

The invention having been generally described, the following examples are given as particular embodiments of the invention and to demonstrate the practice and advantages thereof. It is understood that the examples are given by way of illustration and are not intended to limit the specification of the claims to follow in any manner.

It has been discovered that Cr/silica catalysts can be made by adding chromium (III) acetylacetonate crystals to a fluidized bed of virgin silica or other support, then raising the temperature normally in dry air. The Cr(acac)$_3$ sublimes and reacts with the silica producing a uniformly distributed Cr/silica catalyst. The final calcination temperature can be the usual range from 550° C. to 900° C. However, the Cr(III) is converted to Cr(VI) at surprisingly low temperatures, compared to the usual commercial Cr/silica catalysts made with Cr(III)acetate.

Example 1

A CAT-A of the type disclosed herein was prepared and its properties investigated. Specifically, a silica support material, EP10X, was obtained from Inneos Corp. having a pore volume of 1.6 mL/g, a surface area of 300 m$^2$/g, and an average particle size of 90 microns. Ten grams of the silica support material was added to a 2-inch diameter quartz tube equipped with sintered quartz disk as the gas distributor plate. Then chromium (III) acetylacetonate, Cr(acac)$_3$, crystals were added to the silica, enough to provide chromium equal to 1 wt. % of the silica based on the weight of the support. Then the mixture was heated to 250° C. where it was held for 1 hour while fluidizing in dry air flowing at 0.1 ft/s. The bed was then cooled and a small sample taken for analysis.

Figure 1:
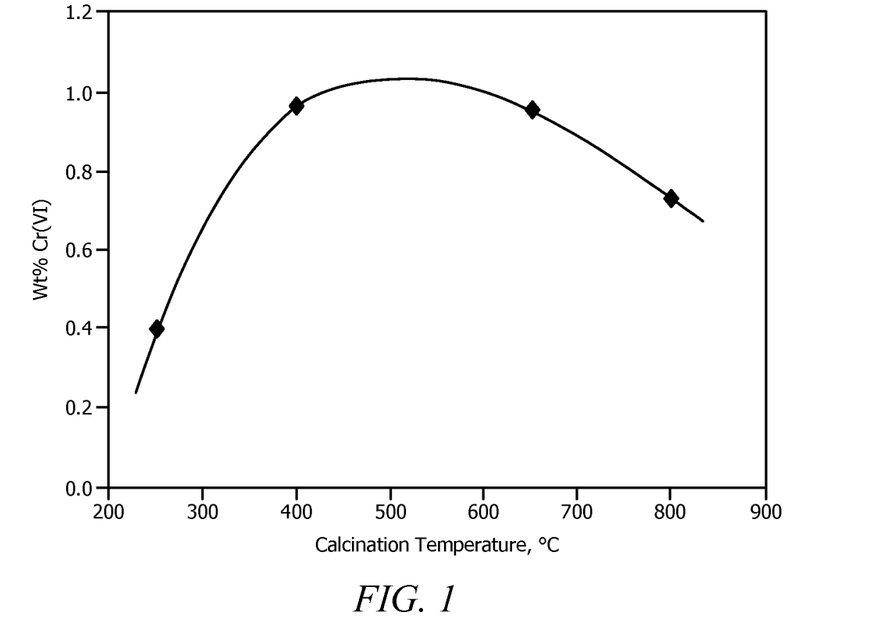
FIG. 1 is plot of the percentage chromium conversion as a function of calcination temperature for the samples from example 1.

The sample was again heated in dry air, this time to 400° C. where it was held for another 1 hour. It was then cooled and sampled again. The process was repeated two more times, next at 650° C. and again at 800° C. These samples were then analyzed for Cr(VI) content. The results of this analysis are shown in Table 1 and FIG. 1. Surprisingly, a high level of Cr(VI) was detected at only 250° C. This is unheard of with standard Cr/silica catalysts made from Cr acetate. By 400° C. all of the Cr(acac)$_3$ had been converted to Cr(VI). At 800° C. the Cr(VI) began to decompose some, losing some of the Cr(VI), as is normal for other catalysts made from this same silica. Without wishing to be limited by theory, this attributable to the instability of Cr(VI) at the high temperature on the silica surface.

TABLE 1

| Temperature (° C.) | Wt. % Cr (VI) |
|---|---|
| 250 | 0.40 |
| 400 | 0.96 |
| 650 | 0.96 |
| 800 | 0.73 |

Accordingly, it has been discovered that a small amount of chromium (III) acetylacetonate, when added to the activator with virgin silica, sublimes when the temperature reaches 100-400° C., and reacts with the silica, distributing itself uniformly throughout the fluidized bed. When the fluidizing gas contains oxygen the Cr is converted to Cr(VI) at much lower temperatures than occurs normally. The temperature is then raised to the usual hold temperature in air (550-900° C.) to produce an active Cr(VI)/silica catalyst. Thus, a polymerization plant need not buy or transport Cr catalyst, but instead need buy silica only and make the catalyst in-situ within the reactor system to minimize worker exposure.

Example 2

Figure 2:
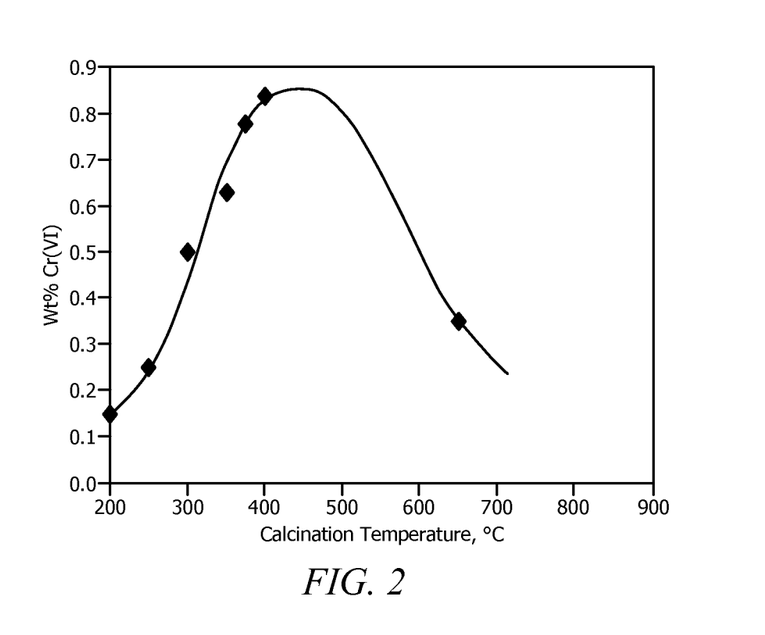
FIG. 2 is plot of the percentage chromium conversion as a function of calcination temperature for the samples from example 2.

A CAT-B of the type disclosed herein was prepared and its properties investigated. Specifically, the procedure described in Example 1 was repeated, except that the silica support material was first calcined in dry air at 800° C. for three hours. The Cr(VI) conversion as a function of calcination temperature is shown in FIG. 2. As observed for example 1, the chromium was distributed evenly and amazingly a large part of it was oxidized to Cr(VI) even at the lowest temperature tested, 200° C. This is unparalleled from previous Cr-supported catalysts. Referring to FIG. 2 it was noted that nearly all of the chromium had converted to Cr(VI) at only 400° C., which is again unprecedented on a dehydrated surface. However, at 650° C. the Cr(VI) began to decompose, presumably due to the dehydrated surface.

Example 3

Figure 3:
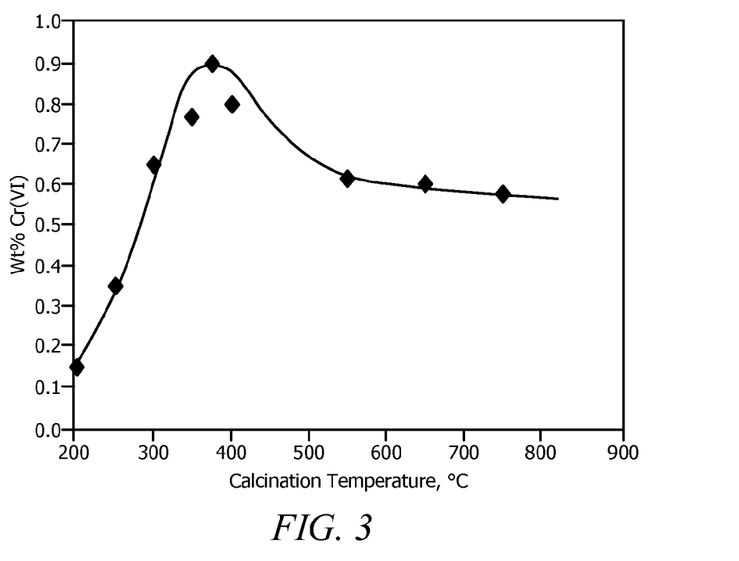
FIG. 3 is plot of the percentage chromium conversion as a function of calcination temperature for the samples from example 3.

The polymerization activity of a CAT-B of the type disclosed herein was investigated. Specifically, a silica-titania cogel was used as the support material. The silica-titania cogel contained 2.5 wt. % Ti, 450 m$^2$/g, 2.5 mL/g and had a 130 micron average diameter. It contained no chromium at the start of the experiment. Ten grams of the support material was again calcined, this time at 850° C. for three hours. The calcined support material was cooled to 25° C. and Cr(acac)$_3$ was added to equal 1 wt. % Cr. The temperature was then raised up to 750° C. in dry air, and samples were taken at various temperatures along the way. The conversion to Cr(VI) is shown in FIG. 3. It shows a very similar pattern to FIG. 2, except that the higher surface area is able to hold more Cr(VI) at the higher temperatures, which is normal behavior. The ease of conversion at low temperatures, however, is again unprecedented.

Figure 4:
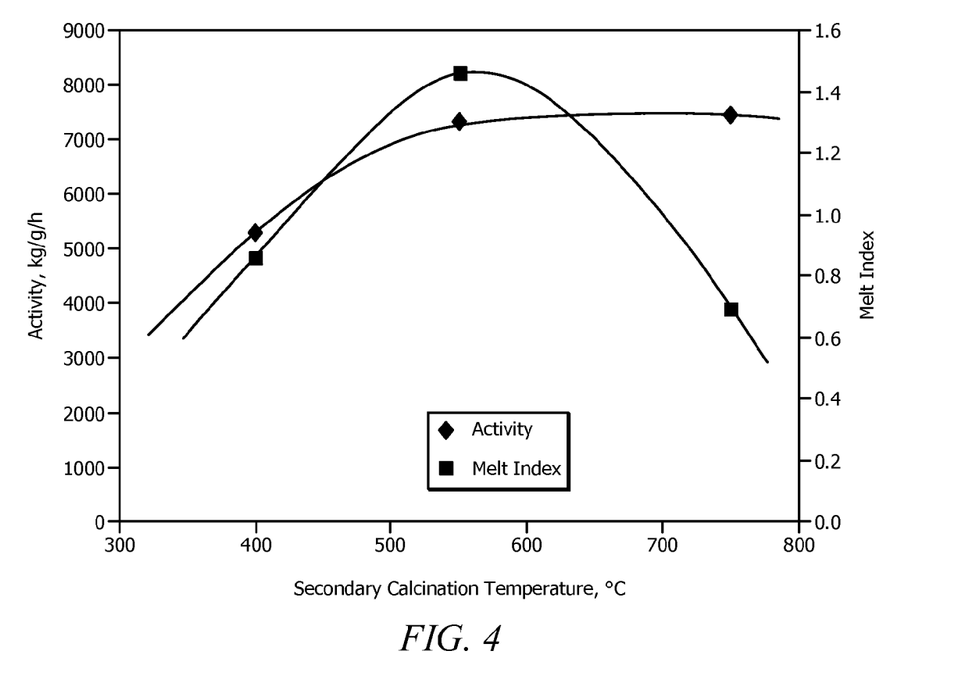
FIG. 4 is plot of the sample melt index and catalyst activity as a function of calcination temperature for the samples from example 3.

Three of these catalysts were tested for polymerization activity. They were quite active, and also produced high melt index PE polymer. The results are shown in FIG. 4. It was observed that polymerization activity increased with secondary calcination temperature, and that melt index goes through a maximum at about 550° C.

For comparison the same silica-titania support, containing chromium added in the conventional way (e.g., impregnation), was activated by normal procedure at 871° C. for three hours, which is a little higher than the 850° C. maximum temperature used in FIG. 4. Despite this, however, the melt index obtained from this standard catalyst was significantly lower than the polymers produced using CAT-B. These results are summarized in Table 2.

TABLE 2

| Sample | Temp (° C.) | Melt Index (g/10 min.) | HLMI |
|---|---|---|---|
| CAT-B-trial #1 | 400 | 0.86 | 73.7 |
| CAT-B-trial #2 | 550 | 1.46 | 112 |
| CAT-B-trial #3 | 750 | 0.69 | 53.4 |
| Comparative #1 | 871 | 0.69 | 59.9 |
| Comparative #2 | 871 | 0.53 | 46.2 |

In another experiment, a silica (e.g., a silica-titania) support was calcined in the activator at a high temperature (600-900° C.), then cooled to 100-150° C., at which point Cr(acac)₃ powder is again added to the activator. Then the temperature was raised in air to some lower temperature (200-400° C.) for a short time (1-5 hours). This catalyst produced much higher MI polymers than an ordinary catalyst activated at the same high temperature.

The following enumerated embodiments are provided as non-limiting examples.

A first embodiment which is a method comprising contacting a support material with a transition metal compound to produce a mixture; thermally treating the mixture in the presence of oxygen at a temperature in a range of from about 100° C. to about 500° C. for a period of from about 1 hour to about 10 hours, wherein at least of portion of the transition metal sublimes onto the support material to produce a support material comprising a dispersed transition metal; and thermally treating the support material comprising the dispersed transition metal in an oxidizing atmosphere at a temperature in a range of from about 550° C. to about 900° C. for a period of from about 1 hour to about 10 hours to produce a polymerization catalyst.

A second embodiment which is the method of the first embodiment wherein the support material comprises silica, alumina, silica-titania, aluminophosphate, zirconia, titania, or combinations thereof.

A third embodiment which is the method of any one of the first through second embodiments wherein the support material comprises virgin silica.

A fourth embodiment which is the method of any one of the first through third embodiments wherein the transition metal compound comprises a chromium complex with 2,4-pentadionate or a chromium complex with a 2,4-pentadionate derivative.

A fifth embodiment which is the method of any one of the first through fourth embodiments wherein the transition metal compound comprises chromium(III) acetylacetonate.

A sixth embodiment which is the method of any one of the first through fifth embodiments wherein chromium is present in the polymerization catalyst in an amount of from about 0.1 wt. % to about 10 wt. % based on the weight of the support material.

A seventh embodiment which is the method of any one of the first through sixth embodiments wherein a percentage conversion of chromium in the (+3) oxidation state to chromium in the (+6) oxidation state for the polymerization catalysts is from about 10% to about 100% at a temperature range of from about 200° C. to about 500° C.

An eighth embodiment which is the method of any one of the first through seventh embodiments further comprising contacting the polymerization catalyst with an olefin monomer under conditions suitable for formation of a polymer and recovering the polymer.

A ninth embodiment which is a method comprising thermally treating a support material at a temperature in a range of from about 550° C. to about 900° C. for a period of from about 1 hour about 10 hours to produce a thermally-treated support material; contacting the thermally-treated support material with a transition metal compound to produce a mixture; and thermally treating the mixture in the presence of oxygen at a temperature in a range of from about 200° C. to about 600° C. for a period of from about 1 hour to about 10 hours, wherein at least of portion of the transition metal sublimes onto the support material to produce a polymerization catalyst.

A tenth embodiment which is the method of the ninth embodiment wherein the support material comprises silica, alumina, silica-titania, aluminophosphate, zirconia, titania, or combinations thereof.

An eleventh embodiment which is the method of any one of the ninth through tenth embodiments wherein the support material comprises silica-titania.

A twelfth embodiment which is the method of any one of the ninth through eleventh embodiments further comprising cooling the thermally-treated support to a temperature in the range of from about 100° C. to about 150° C. prior to contact with the transition metal compound.

A thirteenth embodiment which is the method of any one of the ninth through twelfth embodiments wherein the transition metal compound comprises a chromium complex with 2,4-pentadionate or a chromium complex with a 2,4-pentadionate derivative.

A fourteenth embodiment which is the method of any one of the ninth through thirteenth embodiments wherein the transition metal compound comprises chromium(III) acetylacetonate.

A fifteenth embodiment which is the method of any one of the ninth through fourteenth embodiments wherein chromium is present in the polymerization catalyst in an amount of from about 0.5 wt. % to about 2 wt. % based on the weight of the support material.

A sixteenth embodiment which is the method of any one of the ninth through fifteenth embodiments wherein a percentage conversion of chromium in the (+3) oxidation state to chromium in the (+6) oxidation state for the polymerization catalysts is from about 20% to about 100% at a temperature range of from about 200° C. to about 600° C.

A seventeenth embodiment which is the method of any one of the ninth through sixteenth embodiments further comprising contacting the polymerization catalyst with an olefin monomer under conditions suitable for formation of a polymer and recovering the polymer.

An eighteenth embodiment which is the method of the seventeenth embodiment wherein the polymer has a melt index that is from about 0.5 g/10 min. to about 5 g/10 min.

A nineteenth embodiment which is the method of any one of the seventeenth through eighteenth embodiments wherein the polymer has a high load melt index that is from about 50 g/10 min. to about 200 g/10 min.

A twentieth embodiment which is an article made from the polymer of any one of the seventeenth through nineteenth embodiments.

A twenty-first embodiment which is a method comprising contacting a support material with a transition metal compound to generate a mixture; subliming the transition metal compound in the mixture to produce a support material comprising a dispersed transition metal; and calcining the support material comprising a dispersed transition metal to form a supported polymerization catalyst.

A twenty-second embodiment which is the method of the twenty-first embodiment wherein subliming the transition metal compound comprises heating the mixture to a temperature of from about 100° C. to about 400° C. for a time period of from about 1 hour to about 10 hours.

A twenty-third embodiment which is the method of any one of the twenty-first through twenty-second embodiments wherein calcining the support material comprising a dispersed transition metal comprises heating to a temperature of from about 550° C. to about 900° C. for a time period of from about 1 about to about 10 hour.

A twenty-fourth embodiment which is the method of any one of the twenty-first through twenty-third embodiments wherein the subliming, the calcining, or both is carried out in the presence of oxygen.

At twenty-fifth embodiment which is a method comprising calcining a support material by heating to form a calcined support material; cooling the calcined support material to a temperature of from about 100° C. to about 150° C. to form a cooled calcined support material; contacting the cooled calcined support material with a transition metal compound to form a mixture; and subliming the transition metal compound in the mixture to produce a supported polymerization catalyst comprising a dispersed transition metal.

A twenty-sixth embodiment which is the method of the twenty-fifth embodiment wherein calcining the support material comprising a dispersed transition metal comprises heating to a temperature of from about 550° C. to about 900° C. for a time period of from about 1 hour to about 10 hours.

A twenty-seventh embodiment which is the method of any one of the twenty-fifth through twenty-sixth embodiments wherein subliming the transition metal compound comprises heating the mixture to a temperature of from about 200° C. to about 600° C. for a time period of from about 1 minute to about 10 hours.

A twenty-eighth embodiment which is the method of any one of the twenty-fifth through twenty-seventh embodiments wherein the subliming, the calcining, or both is carried out in the presence of oxygen.

While embodiments of the invention have been shown and described, modifications thereof can be made without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method comprising:
    subjecting a support material to a first thermal treatment at a temperature in a range of from about 550° C. to about 900° C. for a period of from about 1 hour to about 10 hours to produce a thermally-treated support material;
    cooling the thermally-treated support material to a temperature in the range of from about 100° C. to about 150° C.;
    contacting the thermally-treated support material with chromium (III) acetylacetonate, which is in powder or crystal form, to produce a mixture; and
    subjecting the mixture in the presence of oxygen to a second thermal treatment at a temperature in a range of from about 100° C. to about 500° C. for a period of from about 1 hour to about 10 hours, wherein at least a portion of the chromium(III) acetylacetonate sublimes onto the support material to produce a polymerization catalyst and wherein the second thermal treatment occurs at a temperature that is less than the first thermal treatment.

2. The method of claim 1 wherein the support material comprises silica, alumina, silica-titania, aluminophosphate, zirconia, titania, or combinations thereof.

3. The method of claim 1 wherein support material comprises silica-titania.

4. The method of claim 1 wherein chromium is present in the polymerization catalyst in an amount of from about 0.5 wt. % to about 2 wt. % based on the weight of the support material.

5. The method of claim 1 wherein a percentage conversion of chromium in the (+3) oxidation state to chromium in the (+6) oxidation state for the polymerization catalyst is from about 20% to about 100% at a temperature range of from about 200° C. to about 600° C.

6. The method of claim 1 further comprising producing a polymer by contacting the polymerization catalyst with an olefin monomer and recovering the polymer.

7. The method of claim 6 wherein the polymer has a melt index that is from about 0.5 g/10 min to about 5 g/10 min.

8. The method of claim 6 wherein the polymer has a high load melt index that is from about 50 g/10 min to about 200 g/10 min.

9. The method of claim 6 wherein the polymer comprises polyethylene.

10. The method of claim 1 wherein the support material has an average particle size of from about 25 μm to about 500 μm.

* * * * *